United States Patent [19]

Bousaid

[11] 4,100,966
[45] Jul. 18, 1978

[54] OIL RECOVERY PROCESS USING AN EMULSION SLUG WITH TAPERED SURFACTANT CONCENTRATION

[75] Inventor: Issam S. Bousaid, Houston, Tex.

[73] Assignee: Texaco Inc., New York, N.Y.

[21] Appl. No.: 724,680

[22] Filed: Sep. 20, 1976

[51] Int. Cl.² .................................... E21B 43/22
[52] U.S. Cl. ................................. 166/273; 166/274; 252/8.55 D
[58] Field of Search .................. 166/273, 274, 275; 252/8.55 D

[56] References Cited

U.S. PATENT DOCUMENTS

| 3,208,517 | 9/1965 | Binder, Jr. et al. | 166/274 |
| 3,266,570 | 8/1966 | Gogarty | 166/273 |
| 3,346,047 | 10/1967 | Townsend et al. | 166/273 |
| 3,476,184 | 11/1969 | Davis, Jr. | 166/273 |
| 3,508,612 | 4/1970 | Reisberg et al. | 166/274 |
| 3,548,941 | 12/1970 | Graham et al. | 166/273 |
| 3,670,819 | 6/1972 | Dauben et al. | 166/273 X |
| 3,731,741 | 5/1973 | Palmer et al. | 166/275 X |
| 3,811,505 | 5/1974 | Flournoy et al. | 166/273 X |
| 3,860,597 | 1/1975 | Palmer et al. | 166/274 X |
| 3,921,716 | 11/1975 | Tate | 166/273 X |

Primary Examiner—Stephen J. Novosad
Assistant Examiner—George A. Suchfield
Attorney, Agent, or Firm—Carl G. Ries; Thomas H. Whaley; Walter D. Hunter

[57] ABSTRACT

A process for recovering oil from a subterranean reservoir in which a slug comprising a hydrocarbon-in-water emulsion together with a small amount of surfactant injected into the formation via an injection well is forced through the formation and oil is recovered via a production well penetrating the formation. In this process an emulsion slug is employed in which the surfactant concentration is tapered by increasing the concentration of the surfactant either incrementally, gradually or by any other convenient method during the slug injection time.

8 Claims, No Drawings

OIL RECOVERY PROCESS USING AN EMULSION SLUG WITH TAPERED SURFACTANT CONCENTRATION

BACKGROUND OF THE INVENTION

1. Field of the Invention

This invention is concerned with a method of recovering oil from a subterranean reservoir. More particularly, this invention relates to an improved oil recovery process in which a slug comprising a hydrocarbon-in-water emulsion containing a small amount of a surfactant injected into the formation via an injection well is forced through the formation and oil is recovered via a production well penetrating the same formation. During this recovery process the concentration of the surfactant in the emulsion slug is increased during the slug injection time.

2. Description of the Prior Art

The production of petroleum products is usually accomplished by drilling into a hydrocarbon-bearing formation and utilizing one of the well-known recovery methods for the recovery of the hydrocarbons. However, it is recognized that these primary recovery techniques may recover only a minor portion of the petroleum products present in the formation particularly when applied to reservoirs of viscous crudes. Even the use of improved recovery practices involving heating, miscible flooding, water flooding and steam processing may still leave up to 50 percent or more of the original hydrocarbons in place.

Thus, many large reserves of petroleum fluids from which only small recoveries have been realized by present commercial recovery methods, are yet to reach a potential recovery approaching their estimate oil-in-place.

Water flooding is one of the more widely practiced secondary recovery methods. A successful water flood may result in ultimate recovery of up to about 50 percent of the original hydrocarbons in place. However, generally the application of water flooding to many oil reservoirs results in much lower recoveries.

The newer development in recovery methods for heavy crudes is the use of steam injection which has been applied in several modifications, including the "push-pull" technique and through-put methods, and has resulted in significant recoveries in some areas. Crude recovery by this process is enhanced through the beneficial effects of the drastic viscosity reduction that accompanies an increase in temperature. This reduction in viscosity facilitates the production of hydrocarbons since it improves their mobility, i.e., it increases their ability to flow.

However, the application of these secondary recovery techniques to depleted formations may leave major quantities of oil-in-place, since the crude is tightly bound to the sand particles of the formation, that is, the sorptive capacity of the sand for the crude is great. In addition, interfacial tension between the immiscible phases results in entrapping crude in the pores, thereby reducing recovery. Another disadvantage is the tendency of the aqueous drive fluid to finger, since its viscosity is considerably less than that of the crude, thereby reducing the efficiency of the processes.

Consequently, process modifications have been developed which may incorporate additives to lessen the above cited disadvantages and thereby improve the efficiency of these processes. For example, surface-active agents and miscible liquids are utilized to decrease the interfacial tension between the water and the reservoir crude, and thickeners have been developed to adjust viscosity so as to inhibit fingering.

One of the principal objects of this invention is to provide an improved process for increasing the ultimate recovery of hydrocarbon from a hydrocarbon-bearing formation.

Another object of this invention is to provide an efficient method for the recovery of hydrocarbons from a hydrocarbon-bearing formation in which a hydrocarbon-in-water emulsion slug is employed in which the surfactant concentration in the emulsion slug is increased as the slug is injected into the formation.

BRIEF DESCRIPTION OF THE INVENTION

In its broadest sense, this invention relates to a method of recovering oil from a subterranean oil-bearing formation having in communication therein at least one injection well and at least one production well comprising:

(a) injecting into the formation via the injection well a slug comprising a hydrocarbon-in-water emulsion containing a small amount of a surfactant;

(b) injecting water into the formation via the injection well; and (c) recovering oil from the formation via the said production well and wherein the concentration of the surfactant of the said slug is increased as the slug is injected into the injection formation.

The increase in the surfactant concentration in the emulsion slug may be accomplished in a variety of ways such as incrementally in from about 2 to about 5 steps or more over the entire slug injection time or alternatively, the concentration of the surfactant in the emulsion slug may be increased continuously and in a linear manner, if desired, during the time in which the slug is being injected into the formation via the injection well. Optionally, prior to step (b) a slug of a polymer solution such as a solution of a polysaccharide of a polyacrylamide in water may be injected into the formation.

SUMMARY OF THE INVENTION

Generally in the emulsion flooding process of this invention a preflush slug of water equal to about 0.05 to about 0.30 reservoir pore volume and preferably about 0.10 to about 0.20 reservoir pore volume is injected into the formation prior to the introduction of the emulsion slug. The water employed in the preflush step, which generally is of low salinity (i.e., from 20,000 to 50,000 parts per million), should be compatible with subsequent chemical waters injected in the other steps in the process, and in addition, the water may contain, if desired, a sacrificial agent, which is preferably sodium tripolyphosphate, to reduce surfactant losses from the surfactant slug to the reservoir matrix.

In the next step of this emulsion flooding process an emulsion slug equal in amount to about 0.10 to about 0.60 pore volume and comprising a hydrocarbon-in-water emulsion containing a small amount of a surfactant is injected into the formation via the injection well. As previously pointed out one of the novel features of this invention is that during the injection of the emulsion slug the concentration of the surfactant therein is increased in any convenient manner such as incrementally or continuously and, for example, in a linear manner. For example, an emulsion slug having an initial concentration of about 2 percent by weight of hydrocarbon and 0.2 percent by weight (i.e., 0.7 lbs/bbl) of the surfactant may be followed by an equal slug size having about 2 percent by weight of the hydrocarbon and 0.4 percent by weight surfactant (i.e., 1.4 lb/bbl) following which a third slug of equal size is injected having about 2 percent by weight of the hydrocarbon and a surfactant concentration of 0.80 percent by weight (i.e., 2.8 lbs/bbl). Typically, the size of the three slugs may each be equal to about 0.10 pore volume for a total pore volume of 0.30. A final slug equal, for example, in size to 0.20 pore volume may then be injected at a hydrocarbon concentration of about 2 percent by weight and a maximum surfactant concentration of about 1 percent by weight (3.5 lbs/bbl).

The surfactant concetration employed in the emulsion slugs may be varied over a wide range and generally will be from about 0.05 to about 2.0 or more percent by weight. Likewise, the concentration of the hydrocarbon in the hydrocarbon-in-water emulsion may be varied from about 1 to about 12 percent by weight or more and preferably will be from about 2 to about 12 percent by weight based on the weight of the emulsion slug.

Hydrocarbons useful in preparing the hydrocarbon-in-water emulsions of this invention include crude petroleum oil, such as crude oil derived from the same field in which this process is being operated, refined or semirefined petroleum products such as gasoline, naphtha, stove oil, diesel oil, etc. Especially useful hydrocarbons include pentane, butane, propane, mixtures of $C_1$-$C_5$ paraffins, xylene, toluene, etc. Mixtures of these same hydrocarbons may be employed in the process of this invention, if desired. Alcohols such as secondary butyl alcohol may also by employed in small amounts along with any of the above-mentioned hydrocarbons or mixtures thereof in forming the emulsion slugs utilized in this process.

Emulsion slugs suitable for use in the practice of this invention can be prepared in any convenient manner. In one method the hydrocarbon and surfactant together with the secondary butyl alcohol, if used, are combined with mixing after which the required amount of water or brine is added with continued mixing. Preferably the water employed will have a salinity of less than about 100,000 ppm of total dissolved solids (TDS).

The total emulsion slug size employed in this process will range from about 0.15 to about 0.75 pore volume or more. The total slug size and the maximum surfactant concentration are usually determined from laboratory and field flood tests.

In the final step of this recovery process a water drive is employed. The composition of the water injected during the last phase should be compatible with all slug compositions injected during the process. Injection of the drive water is continued to completion of the chemical flood process.

If desired, prior to injection of the drive water a polymer slug may be injected for mobility control into the formation. Generally, the polymer slug will comprise the water solution of a polymer equal in volume to about 0.05 to about 0.50 pore volume or more containing a low concentration of polymer varying from about 200 to 1000 parts per million and preferably from about 200 to about 800 parts per million. If desired, the polymer slug may be tapered in a linear or any other convenient manner by decreasing the polymer concentration from its maximum value to 0. This procedure is a desirable measure which results in minimization of fingering (or channeling) of the drive water through the oil bank and prevents early breakthrough of the flood.

One class of hydrophilic polymer water thickening materials suitable for use in this invention is the polysaccharide or biopolymer compounds, many of which are readily available commercially. For example, in U.S. Pat. No. 3,208,518 there is disclosed a water flooding process wherein the viscosity of the flooding medium is increased by the use of high molecular weight polymers, specifically an ionic polysaccharide produced by the fermentation of carbohydrates by bacteria of the genus Xanthomonas, under controlled pH conditions.

Numerous other polymers are suitable for use in this invention for mobility control such as partially hydrolyzed polyacrylamide which may be graphically illustrated by the following formula:

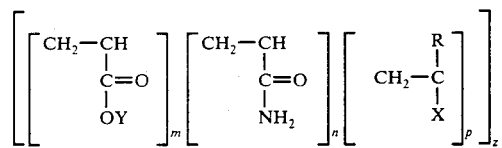

wherein Y represents hydrogen, ammonium, and alkali metal or an alkaline earth metal, R represents hydrogen or a metal radical, X represents chlorine, a lower alkoxy or acyloxy group or a cyanide radical, m ranges from 12 to 67, n ranges from 33 to 88, p ranges from 0 to 10, and the sum of m, n, and p equals 100, an z is at least about 60. This class of polymers is known for the purpose of increasing the viscosity of the injected fluid an the efficiency with which the injected flui displaces petroleum, specifically being disclosed in U.S. Pat. No. 3,039,529 (1962). Polyacrylamide itself is also a satisfactory polymer for use in the polymer slug of this invention.

Other excellent polymers for use in the aqueous polymer solution slug are the polyvinyl aromatic sulfonates having relatively high molecular weights and yet being soluble in water. Polymers of this class have the following general formula:

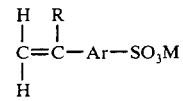

wherein Ar is divalent monocyclic hydrocarbon unit derived from benzene or benzene derivatives, R is hydrogen or a metal ion, and M is hydrogen, sodium or potassium. The use of this polymer for mobility ratio improvement in oil recovery operations is more fully detailed in U.S. Pat. No. 3,282,337 (1966).

Another class of hydrophilic polymers which can be used for mobility control in the polymer slug, if employed, is the flocculant grade water soluble polyethylene oxides such as described in U.S. Pat. No. 3,021,231.

In selecting a surfactant or surfactants for use in the hydrocarbon-in-water emulsion slug employed in this invention any of the surfactants commonly employed in petroleum recovery systems be utilized.

Surfactants are classified on the basis of the hydrophilic or water soluble groups in the molecule and are generally recognized as falling in one of the following groups:

1. Anionic, meaning the surfactant molecule has one or more anionic, hydrophilic or water soluble groups.

The most typical of these groups are the carboxylates, sulfonates, sulfates, and phosphates. The anionic surfactants are by far the most important group, and are the surfactants of choice in oil recovery operations unless there are compelling reasons to resort to the use of other types of surfactants.

2. Cationic surfactants, wherein the hydrophilic or water soluble groups are primary, secondary or tertiary amines or quaternary ammonium groups.

3. Nonionic surfactants which are characterized by the occurrence of hydroxyl or polyoxyethylene chains which provide the hydrophilic character to the molecule.

4. An amphoteric group is sometimes recognized for molecules having combinations of anionic and cationic moieties present on the same molecule.

The hydrophobic or oil soluble component of a surfactant molecule is almost always a hydrocarbon or halogen substituted hydrocarbon.

The molecular weight of surfactants ranges from around 200 1 to about 20,000 or more and preferably from about 300 to about 600. Commercially available surfactants are seldom composed essentially of the same molecular species; rather they are more often polydispersed compounds (the molecules all have the same functional groups but vary in chain length or some other structural detail).

Petroleum sulfonates which are presently among the more popular classes of surfactants being considered for supplemental oil recovery techniques also may be employed in this process. The various materials available under the general name of petroleum fraction used for sulfonation and in the degree of sulfonation imparted to the petroleum fraction. A preferable petroleum sulfonate is described in U.S. Pat. No. 3,302,713 (1967) disclosing a petroleum sulfonate prepared from a petroleum fraction whose boiling range is from 700° F to 1100° F which corresponds to a molecular weight range of from about 350 to about 600. The sodium salt of the sulfonation product of this petroleum fraction is an excellent material for use in the subject invention.

One surfactant composition which has shown to be especially good in the hydrocarbon-in-water emulsion consists of a dual surfactant system comprising a sodium salt of tridecylbenzene sulfonate (Conoco 650) and as a solubilizer surfactant a sodium sulfated/sulfonated polyethoxylated nonyl phenol. These particular materials which are anionic surfactants have average molecular weights equal to 362 and 518, respectively. In this dual surfactant system three parts by weight of sodium tridecylbenzene sulfonate and one part sulfated/sulfonated ethoxylated nonyl phenol are generally employed. Such surfactant compositions when included in the emulsion slug are highly effective in mobilizing and recovering oil from limestone formations. Other dual surfactant systems such as the sodium or ammonium salt of alkyl aryl sulfonic acid and nonionic surfactants such as polyethoxylated alkyl phenols are also effective in the process of this invention. Another anionic surfactant useful in this process as a solubilizer in the surfactant solution is sodium tridecyl polyethoxylated sulfate. Petroleum sulfonates which likewise are also useful in the process of this invention but require increased concentrations.

If desired, the drive fluid, which is preferably water, may contain dissolved therein from about 0.01 to about 1.00 percent or more by weight of a solubilizing agent and in addition the drive fluid employed in this invention may include an alkaline agent in an amount sufficient to form a 0.001 to about 0.1 molar solution. Useful alkaline agents include sodium hydroxide, potassium hydroxide, sodium hypochlorite, etc.

A wide variety of solubilizing agents may optionally be included in the drive fluid of this invention. An especially useful group of solubilizing agents are water-soluble, oxyalkylated, alkyl alkanol amine compounds of the formula:

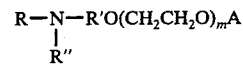

wherein R is alkyl of from 1 to about 16 carbon atoms; wherein R' is alkylene of from 2 to 4 inclusive carbon atoms as exemplified by ethylene, propylene, butylene and isobutylene etc. and isomers thereof; $m$ is an integer of from 4 to about 60 or more; A is selected from the group consisting of hydrogen, sodium, potassium and the ammonium ion, and wherein R" is selected from the group consisting of hydrogen, alkyl of from 1 to about 16 carbon atoms and —R'O $(CH_2CH_2O)_m$A. Typical alkyl groups include methyl, ethyl, isopropyl, n-butyl, t-butyl, isohexyl, n-heptyl, n-decyl, n-dodecyl, etc.

Illustrative of the water-soluble, oxyalkylated, alkyl alkanol amines which can be employed as solubilizers in the process of this invention are the following:

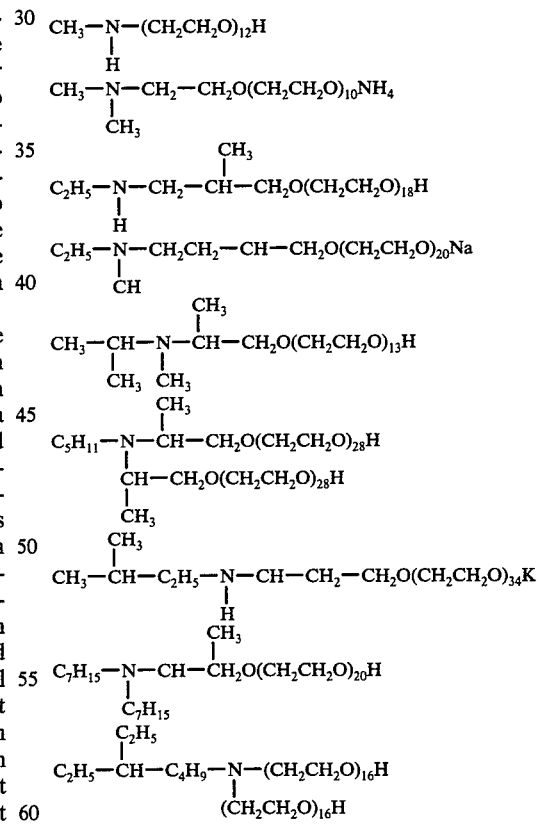

The above-described, oxyalkylated, alkyl alkanol amines can be conveniently prepared by methods well known in the art from commercially available alkyl alkanol amines. For example, these oxyalkylated compounds can be made by the methods set out in U.S. Pat. Nos. 3,062,747; 2,174,761 or 2,435,755. In general, the procedure consists of reacting the alkyl alkanol amine with ethylene oxide in the presence of an oxyalkylation catalyst such a sodium hydroxide at about 150° C in a stirred autoclave.

Another group of solubiling compounds which are highly useful in the aqueous drive fluid employed in the process of this invention are the sulfated and sulfonated derivatives of the previously described oxyalkylated alkyl alkanol amines as well as the alkali metal and ammonium salt of such sulfated or sulfonated derivatives.

Sulfated, oxyalkylated, alkyl alkanol amines useful as solubilizers in the drive fluid of this invention include compounds of the formula:

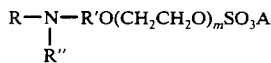

wherein R is alkyl of from 1 to about 16 carbon atoms; R' is alkylene of from 2 to 4 inclusive carbon atoms, $m$ is an integer of from about 4 to about 60, A is selected from the group consisting of hydrogen, sodium, potassium, and the ammonium ion and wherein R" is selected from the group consisting of hydrogen, alkyl of from 1 to about 16 carbon atoms and $R'O(CH_2CH_2O)_mSO_3A$. The sulfated, oxyalkylated alkyl alkanol amines can be prepared by methods well known in the art such as by treatment of the oxyalkylated, alkyl alkanol amine with sulfuric acid followed by neutralization to form the metal or ammonium salt, if desired.

Sulfonated derivatives of these same oxyalkylated alkyl alkanol amines can likewise be prepared by reacting the above-described sulfated products with sodium sulfite at temperatures of about 150° to about 200° C or more for about 5 to 10 hours. The sulfonated compounds and their alkali metal and ammonium salts suitable for use as solubilizing agents in the drive fluid of this invention have the formula:

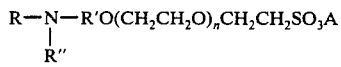

where R, R', and A have same meaning as described for the sulfated oxyalkylated, alkyl alkanol amines set out above; $n$ is an integer of from about 4 to about 60 and R" is selected from the group consisting of hydrogen, alkyl of from 1 to about 16 carbon atoms and $R'O(CH_2CH_2O)_nCH_2CH_2SO_3A$.

Typical sulfonated solubilizing agents of the type described above include the following compounds:

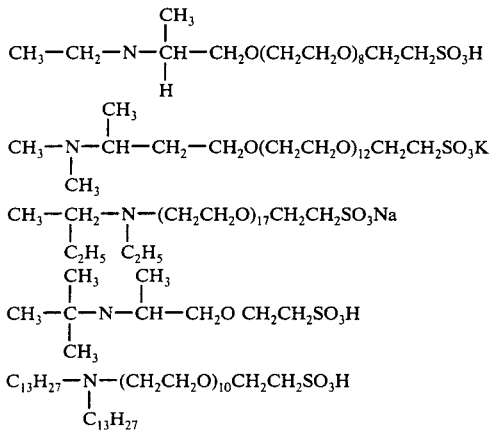

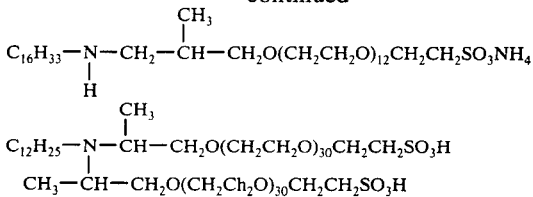

Isomers of the above-mentioned sulfonated derivative may likewise by employed in the oil recovery process of this invention.

EXAMPLE I

The following example illustrative one embodiment of this invention and is to be considered not limitative.

A petroleum-containing formation located at a depth of 5800 feet in a limestone formation is exploited by means of conventional water flooding operations using an inverted five spot pattern until the water-oil ratio rises above about 30. The formation thickness is 30 feet and the porosity is 25 percent. In this inverted five spot pattern the center well is employed as an injection well while the four remaining wells serve as production wells. The dimensions of the square grid on which the inverted five spot pattern is based is 500 feet and it is known that only 75 percent of the reservoir will be swept by the injected fluid using the standard five spot pattern. The pore volume of the pattern swept by the injected fluid will be 500 × 500 × 30 × 0.25 × 0.75 = 1,406,250 cubic feet. The salinity of the water contained in the formation is 90,000 parts per million. A total of 0.1 pore volume (140,600 cubic feet) of a preflush solution having a salinity of about 35,000 parts per million and having dissolved therein 0.06 weight percent of sodium tripolyphosphate is injected into the formation via the injection well. This is followed by the injection into the formation of the emulsion slug which consists of four parts. In the first part an emulsion slug equal to about 0.1 pore volume or 140,600 cubic feet comprising water containing about 4 percent by weight of pentane and about 0.2 percent by weight of a dual surfactant system (0.7 lb/bbl) consisting of the sodium salt of tridecylbenzene sulfonate and sodium sulfated ethoxylated nonyl phenol having the formula:

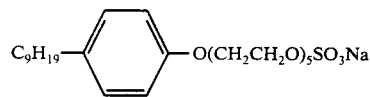

was injected into the formation. Next, a second emulsion slug equal to about 0.1 pore volume comprising water containing about 4 percent by weight of pentane and about 0.4 weight percent (i.e., 1.4 lb/bbl) of the same surfactants was injected into the formation followed by injection of a third slug of equal size comprising water containing about 4 percent by weight of pentane and about 0.80 weight percent (i.e., 2.8 lbs/bbl) of the same surfactants. Finally, a fourth emulsion slug of about 0.2 pore volume comprising water and about 4 percent by weight of pentane and 1 weight percent of the same surfactants was injected into the formation. About 3 parts by weight of the tridecylbenzene sulfonate was utilized for each part by weight of the sodium sulfated ethoxylated nonyl phenol included in each of the emulsion slugs. Next 0.4 pore volume (562,500 cubic feet) of water containing 400 parts per million of polysaccharide polymer and containing about 0.02 weight percent of a sulfonate solubilizer of the formula:

is injected into the formation. This is followed by the injection of drive water having a salinity of about 35,000 parts per million to displace the banked emulsion slug oil, and thickened water through the formation. Oil is produced through the associated production wells in the five spot pattern, and the amount of oil produced is substantially in excess of that produced by water flooding alone.

What is claimed is:

1. A method of recovering oil from a subterranean oil-bearing formation having in communication therewith at least one injection well and at least one production well comprising:
   (a) injecting into the formation via the injection well a slug comprising a hydrocarbon-in-water emulsion containing a small amount of a surfactant,
   (b) injecting water into the formation via the injection well; and
   (c) recovering oil from the formation via the said production well and wherein the concentration of the surfactant in the said slug is increased as the slug is injected into the said formation.

2. The method of claim 1 wherein prior to step (a) a preflush slug of water is injected into the formation via the injection well.

3. The method of claim 1 wherein the concentration of the surfactant in the said slug is incrementally increased as the slug is injected into the said formation.

4. The method of claim 1 wherein the concentration of the surfactant in the said slug is continuously increased as the slug is injected into the formation.

5. The method of claim 1 wherein prior to step (b) there is introduced into the said formation a slug of an aqueous polymer solution.

6. The method of claim 5 wherein the said polymer is selected from the group consisting of polyacrylamide, partially hydrolyzed polyacrylamide, and a polysaccharide.

7. The method of claim 1 wherein the step (b) saline water is injected.

8. The method of claim 1 wherein the water injected in step (b) contains a small amount of a solubilizing agent selected from the group consisting of:
   (a) a compound of the formula:

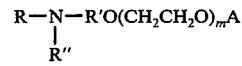

wherein R is alkyl of from 1 to about 16 carbon atoms; wherein R' is alkylene of from 2 to 4 inclusive carbon atoms; $m$ is an integer of from 8 to about 60; A is selected from the group consisting of hydrogen, sodium, potassium and the ammonium ion and wherein R'' is selected from the group consisting of hydrogen, alkyl of from 1 to about 16 carbon atoms and $R'O(CH_2CH_2O)_m A$;
   (b) a sulfated compound of the formula:

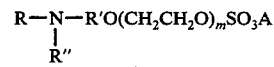

wherein R, R', $m$ and A have the same meaning as in (a) above, and R'' is selected from the group consisting of hydrogen, alkyl of from 1 to about 16 carbon atoms and $R'O(CH_2CH_2O)_m SO_3A$, and
   (c) a sulfonated compound of the formula:

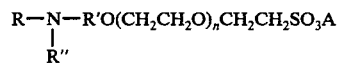

wherein R, R' and A have the same meaning as in (a) above; wherein $n$ is an integer of from about 8 to about 60 and R'' is selected from the group consisting of hydrogen, alkyl of from 1 to about 16 carbon atoms and $R'O(CH_2CH_2O)_n CH_2CH_2SO_3A$.

* * * * *